Aug. 4, 1936.  P. ORLANDO  2,050,017
COURSE GOVERNOR FOR DIRIGIBLE CRAFTS
Filed Nov. 26, 1934  2 Sheets-Sheet 2
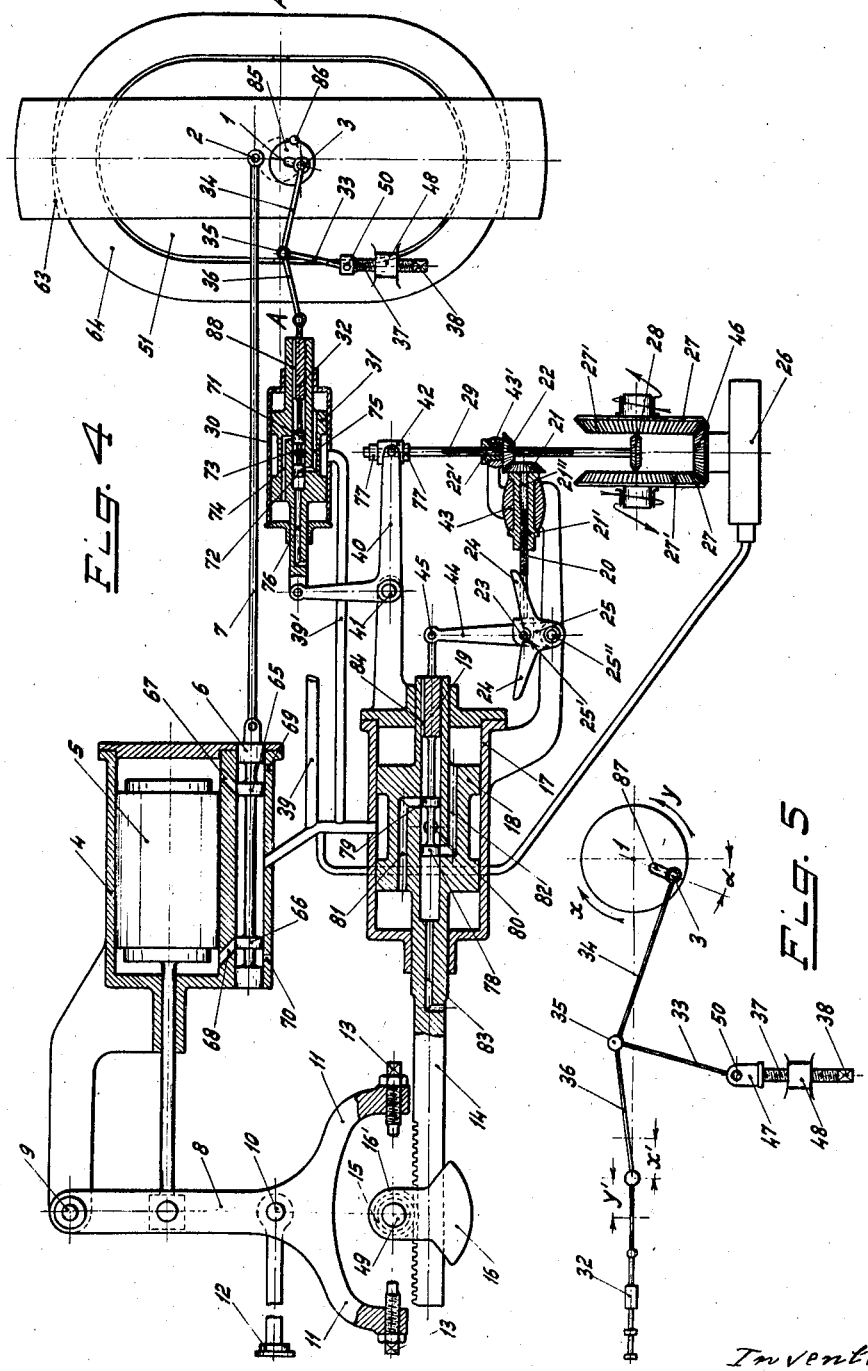
Inventor:
Paolo Orlando
By [signature]
Attorney.

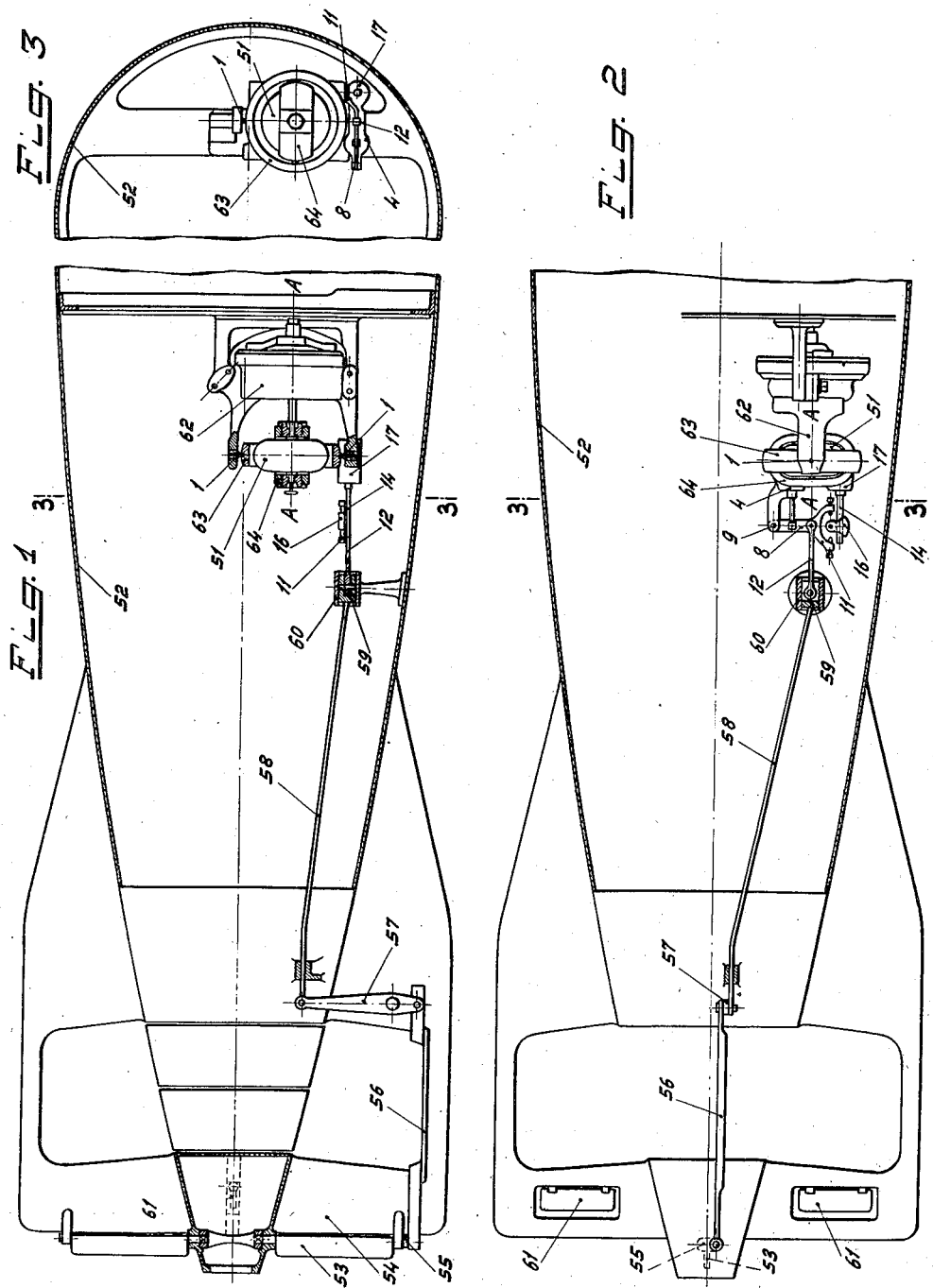

Patented Aug. 4, 1936

UNITED STATES PATENT OFFICE 2,050,017

COURSE GOVERNOR FOR DIRIGIBLE CRAFTS

Paolo Orlando, Fiume, Italy, assignor to Silurificio Whitehead Di Fiume Societá' Anomina, Fiume, Italy Application November 26, 1934, Serial No. 754,890
In Italy December 12, 1933

28 Claims. (Cl. 244—29)

This invention relates to gyroscopic governors for dirigible craft, as aircraft, watercraft, torpedoes and vehicles of any kind.

Gyroscopic governors are known which are intended to hold the course of a craft in a predetermined direction, and devices are also known which are designed to restore a craft to a predetermined direction when it has deviated therefrom; however in the operation of such known devices the disspacement, from the initial path, due to the manœuvering curve travel which the craft is caused to follow in its restoration to the original direction, is maintained, and therefore the actual course, although parallel to the predetermined course, is spaced therefrom on account of the deviations the craft has been subject to during its travel.

As a matter of fact, the known gyroscopic governors cause a craft to move along a course which is parallel with the desired one and spaced therefrom through variable and uncontrolled amounts rather than along a desired predetermined course.

This invention has for its object a device enabling a craft to be held not only in a predetermined direction but actually on a predetermined course or path of travel, and to be restored on such a predetermined course whenever said craft has deviated therefrom.

According to this invention a craft having a rudder and a governor therefor, is provided with means acting on the rudder steering gear and put under the control of the amount, direction and duration of the angular deviation of the craft from the course it is required to travel along, said means introducing in the rudder steering gear a correcting factor which depends upon the amount, the duration and the direction of said deviation in respect of the beginning, duration and direction of its action; said correcting factor may also be put under the control of the listing the craft may take when it starts its travel under particular conditions.

When the deviation of the craft with respect to the desired course reaches or exceeds a predetermined amount, said correcting factor acts to delay the restoring action exerted by the gyroscopic director on the rudder; thus the time through which the rudder is held shifted and therefore the duration and extent of its approach path are extended by such an amount as the rudder is subsequently shifted by its gyroscopic director at an angle opposite to the previously existing angle just at the time required to cause the craft to follow an approach in a reverse direction with respect to previous one; the craft being thus carried again on the predetermined direction and on the line of path passing through its starting position.

When the craft is on correct direction and line of path, the course governing action, which consists in shifting the rudder on opposite sides to carry the craft on the correct direction should it deviate therefrom by effect of external causes, is devoted to the gyroscopic director exclusively, but whenever the amount of deviation from the initial line of travel exceeds a predetermined value, said correcting factor is again made operative and the craft is restored on its initial line of path by the above described operation.

An embodiment of this invention is hereinafter described in connection with the course governing means of a torpedo, with reference to annexed drawings in which Figure 1 is a fragmentary vertical section of the aft portion of the shell of a torpedo with the means of this invention embodied therein;

Figure 2 is a similar horizontal section;

Figure 3 is a transverse section on line 3—3 of Figures 1 and 2;

Figure 4 shows in detail and to an enlarged scale the means of this invention with parts in section, and Figure 5 is a diagrammatic enlarged view of parts of said means.

In the illustrated embodiment 52 is the shell of a torpedo having propelling means not shown and a rudder 53 supported by tail fin 54 and operated by crank lever 55, bar 56, lever 57 and rod 58 this rod having a fork head 59 reciprocating in a guide member 60 and operated by a rod 12 hereinafter described.

The torpedo is also provided with a depth rudder 61 whose operating means are not shown nor described as they being of no interest in respect of the present invention.

The course governor of the torpedo comprises a gyroscopic director 62 whose rotor 51 is mounted in gimbal rings 63 and 64 suitably supported in conventional and well known manner; A—A denotes the spinning axis of said rotor 51 and I shows the axis of the vertical trunnions of its vertical gimbal ring, said trunnion being omitted in Figure 4 to make more clear the operation.

Said vertical ring 63 has an eccentric crank pin 2 which actuates a rod 7 operating the distributor 6 of a pressure fluid servo-motor comprising a cylinder 4 and a piston 5 therein; the stem of said piston 5 actuates an arm 8 fulcrumed at 9 and driving rod 12 which has one end pivotally connected at 10 with arm 8 while its rear end actuates the fork head 59 and the directional rudder 53 as above referred to.

The piston 5 is operated by a pressure fluid supplied through a pipe 39 connected with any suitable source of pressure fluid, not shown, said supply being made under the control of a distributor 6 which by means of its distributing collars 65, 66 and ducts 67, 68, 69, 70, causes the fluid to operate on either face of piston 5 and exhausts it on the opposite piston face in accordance with the position imparted to said distributor 6.

The ring 63 has a further crank pin 3 which operates a linkage consisting of rods 34 and 36 interconnected by a pivot 35 as hereinafter described; said linkage actuates a distributor 32 having collars 71 and 72 which control ducts 73, 74, 75, 76 of a second servo-motor 30 also operated by pressure fluid supplied through pipe line 39, 39'; the piston 31 of servomotor 30 actuates an arm of a crank lever 40 fulcrumed on a stationary part 41 fast on the torpedo shell; the other arm of said crank lever 40 is pivotally connected with a head 42.

A spindle 29 is engaged longitudinally at one end with said head 42 as by means of collars 77, while being loose in rotation with respect thereto, and said spindle 29 has at its opposed end a roller 28 fast thereon.

The spindle 29 is splined to slide longitudinally within the bored hub 22' of a bevel pinion 22 loose in support 43' while being engaged in rotation with said hub to be driven by pinion 22; bevel pinion 22 meshes with a bevel pinion 21 whose bored hub 21' is loose in the stationary support 43 and has a screwthread 21" in its bore.

A screwthreaded stem 20 is engaged within the bore of hub 21'; said stem 20 is prevented from rotating around its axis and has a finger 23 adapted to cooperate with a rocker 24—25 fulcrumed at 25".

The rocker 24—25 comprises a recess 25' and two wings 24 extending at the sides of said recess in the direction of stem 20; said recess 25' and wings 24 are intended to cooperate with finger 23 the edge of said wings 24 being shaped as illustrated to obtain that when finger 23 acts on the rocker in the recess 25' thereof adjacent its fulcrum 25" said rocker is caused to oscillate around such fulcrum while rocker 24, 25 is left stationary when said finger 23 moves along the edges of rocker wings 24 after oscillated.

Rocker 25 is fast with an arm 44 pivotally connected at 45 with the rod of a distributor 19 of a third servo-motor cylinder 17 supplied by pipe line 39 and whose piston 18 actuates by the intermediate of rack bar 14 and pinion 15, a locking quadrant 16 solid with spindle 49 of pinion 15 said spindle 49 being loose in a stationary support; said distributor 19 comprises collars 78 and 79 controlling passages 80, 81, 82, 83, 84. Said locking quadrant 16 may take positions at right angles on both sides with respect to its intermediate position illustrated on the drawings to come in front to either of two abutments consisting of concentric adjusting screws 13 carried by respective legs of a fork 11 extending from arm 8.

The lost motion intermediate the end of each abutment 13 and the depressed hub portion 16' of quadrant 16 corresponds with the maximum steering angle permissible for the rudder while the radius of the quadrant 16 is such as when the rim of said quadrant is carried in the path of the abutments 13, it stops either of said abutments 13 with the rudder operating parts connected therewith at a distance from their position by which the rudder is held in straight path position, such distance corresponding with a steering angle at least equivalent with the inertia angle of the torpedo or momentum angle.

The roller 28 is located intermediate two friction disks 27, 27 concentric with each other and each having a toothed rim 27' in mesh with a bevel pinion 46 solid with the rotor of a pressure fluid rotary motor 26 supplied from line 39; the spindle 29 is located along a diameter of disks 27, 27, and therefore when it is shifted longitudinally the points of contact of roller 28 with disks 27, 27 are shifted along said diameter of said disks.

In normal conditions, that is when the spinning axis A of rotor 51 of the gyroscopic director is parallel with the axis of the torpedo shell, the parts are in the conditions illustrated in Figure 4, that is: the pistons 5, 18 and 31 of servomotors 4, 17, and 30 are in the middle portion of their stroke within respective cylinders, the distributors 6, 19 and 32 are in position to cut off all the ducts respectively controlled thereby and the roller 28 is on the common rotary axis of the two disks 27, 27 which are driven in continuous rotation by the motor 26 and therefore said roller 28 is stationary.

When a deviation through a certain angle occurs intermediate the spinning axis A of the rotor 51 of the gyroscopic director and the torpedo axis, due to the well known action of gyroscopic directors producing a deviation of ring 63 the crank pin 2 is shifted with respect to the torpedo shell and parts solid therewith, then the distributor 6 of the servomotor 4 is shifted and pressure fluid is supplied from pipe 39 into either of chambers of said cylinder 4 through respective ducts; therefore piston 5 is shifted along said cylinder and arm 8 is caused to oscillate around pivot 9 and finally rod 12 is moved through arm 8 to steer the torpedo rudder by the intermediate of parts 59, 58, 57, 56, 55, 53 through an angle as required to restore the torpedo in correct direction.

At the same time as crank pin 2, also crank pin 3 solid with ring 63 is shifted and said crank pin 3 moves the distributor slide 32 of the servomotor 30; then the pressure fluid supplied by line 39 is fed through respective passages which at such time are cleared off by collars 71 and 72 of distributor 32 to either of chambers of cylinder 30 and piston 31 is moved in either direction.

The longitudinal motion of said piston 31 causes the oscillation in either direction of crank lever 40 around its stationary fulcrum 41; therefore the spindle 29 is moved longitudinally said spindle sliding in the bored hub 22' of pinion 22 and causing the roller 28 to contact with rotary disks 27, 27 at a certain distance from their rotary axis in either direction, along the diameter on which said spindle 29 is located.

Therefore during the time in which the axis of the torpedo is at an angle with respect to spinning axis A of the rotor of the gyroscopic director, the roller 28 is driven in rotation by the disks 27, 27 with a velocity proportional to the angle existing between the torpedo axis and rotor spinning axis A above referred to, bearing in mind that the spacement of roller 28 from rotary axis of disks 27, 27 along a diameter of said disks is proportional with said deviation; therefore pinion 21 and hub 21' thereof are driven in rotation by pinion 22 and the stem 20 is shifted with finger 23 causing the rocker 24—25 to oscillate around its fulcrum 25".

Then the arm 44 of said rocker 24—25 shifts the distributor 19 to cause the pressure fluid to enter a chamber and to exhaust from the other chamber of cylinder 17; the piston 18 is thus actuated to move quadrant 16 by the intermediate of rack bar 14 and pinion 15 until said quadrant is in either of its positions at a right angle with respect to its central position illustrated in Figure 4.

The construction and arrangement of the several gears is such as the quadrant 16 is always rotated to come in front of that one of the abutments 13 which, due to the described operation of piston 5 has moved away from the axis of rotation of pivot spindle 49 of said quadrant.

Quadrant 16 takes an exceedingly short time to reach its position at a right angle to the illustrated one; meanwhile roller 28 is held spaced from axis of disks 27, 27 along the full time through which the torpedo is deviated from the direction it must travel along and therefore said roller 28 is rotated and it drives in rotation, through gearing 22, 21, the hub 21' which in turn shifts longitudinally stem 20 whose finger 23, after having oscillated the rocker 25 through an angle as required to produce the angular deviation of quadrant 16, slides along the edge of one of wings 24.

Therefore, said rocker after having moved the quadrant 16, is left stationary and allows for the free longitudinal motion of stem 20 and finger 23 which move from their intermediate position through a space proportional with the number of revolutions the roller 28 is rotated through.

When, during the curve travel it effects under action of rudder 53, the torpedo has reached the direction it is required to subsequently follow, and therefore the spinning axis A is again parallel with the torpedo axis, ring 63 and crank pins 2 and 3 thereof are restored in their original positions and therefore the distributor 32 comes again in its intermediate position the piston 31 of servomotor cylinder 30 being also restored in its intermediate position; said piston 31 by the intermediate of arm 40 causes the roller 28 to come exactly on the axis of disks 27, 27 and thus said roller 28 is now stationary. Then also stem 20 is stationary and finger 23 is stopped at the end of the stroke it has moved due to the described operation thus holding distributor 19 and quadrant 16 in the position they have reached.

At this time crank pin 2 has taken up its normal intermediate position and therefore distributor 6 is also in its intermediate position in which the several ducts controlled thereby are shut; exhaust from both chambers of the cylinder 4 is shut and therefore piston 5 is left stationary at the end of its stroke it has reached in its previous operation as described; consequently the rudder is held fully steered on proper side and therefore the torpedo prosecutes its curve travel towards its original path.

When the torpedo has passed the point in such travel in which its axis is parallel with the desired course and is at an angle to such course equal to torpedo angle of inertia with respect to action of its rudder, the gyroscopic director is again operative and the distributor 6 reverses the supply and exhaust of pressure fluid to and from cylinder 4; therefore the piston 5 is shifted and it oscillates the arm 8 to move the rudder operating rod 12 and to steer the rudder unto reverse side; under the action of distributor 6 the piston 5 would effect its full stroke and reach the opposite end of cylinder 4 to fully steer the rudder on the reverse side with respect to previously existing conditions but such an operation of said piston 5 is prevented because after a certain displacement of piston 5 and arm 8, one of abutment screws 13 of fork 11 solid with arm 8, according to the side on which the rudder was previously steered, engages the quadrant 16 which has been moved as described towards said abutment screw through 90° with respect to illustrated position and is held in such deviated position by effect of the described operation.

Accordingly said quadrant 16 locks the parts 8, 5, 11, 12 in a position by which said parts hold the rudder 53 steered on the side it had previously been steered, and through an angle whose extent depends upon the radius of the quadrant 16; therefore said angle of steer is smaller than the angle of steer corresponding with the torpedo deviation in respect of which said quadrant 16 would be operated. Therefore the rudder 53 is held steered at a certain angle on the same side as before and the torpedo travel is still steered as before and thus it further deviates with respect to the predetermined direction of its course while moving towards the predetermined path it is required to follow.

The operation of the gyroscopic governor due to the above described further deviation causes the crank pin 3 to move and to actuate distributor 32 in a direction opposed to the previous one; therefore the piston 31 is shifted and brings the roller 28 to cooperate with the portions of disks 27 which are on the opposite side, with respect to diameter of such disks perpendicular to spindle 29, to the portions thereof said roller 28 was cooperating with in previous operation. Therefore roller 28 is driven in a reverse direction with respect to previous one; accordingly said roller 28 drives in reverse direction through gears 22, 21, the hub 21' which moves the stem 20 and finger 23 longitudinally in reverse direction.

Therefore finger 23 slides towards its intermediate position along the edge of either of wings 24, said edge being parallel to the path of said finger in view of described configuration of rocker wings 24. At the time the roller 28 has moved in this reverse direction of rotary motion a number of revolutions equal to number of revolutions it has previously moved through after finger 23 has released the rocker recess 25', said finger 23 again engages said recess and therefore the rocker 25, and thus the further stroke of finger 23 restores the rocker 25 in its intermediate position.

Then also distributor 19 takes again its intermediate position and causes the piston 18 and the quadrant 16 actuated thereby to be restored in their intermediate position. Then arm 8, whose fork 11 and abutments 13 are not longer engaged by quadrant 16, allows the piston 5 which is under the action of pressure fluid, to move and actually reach the end of the cooperating cylinder towards which it is moved by pressure fluid; said piston 5 by arm 8 and rod 12 steers the rudder 53 on the reverse side with respect to that it was steered on due to the deviation of the torpedo and thus produces a deviation of the torpedo in opposite direction than before under a rudder angle equal to that previously imparted to said rudder under the action of quadrant 16.

When the torpedo deviates beyond the predetermined direction through an angle equal to its inertia angle, the positions of crank pins 2 and 3 are again reversed, and the piston 5 is carried by effect of the operation of the distributor 6 at the opposite end of cylinder 4 and thus the rudder is fully steered because finger 23 does not release recess 25' of rocker 24—25 in respect of deviations of the torpedo lying within given ranges of duration and angle and therefore said rocker follows always directly the motion of finger 23 within such ranges and quadrant 16 is not locked to engage the abutment 13 in front of it; in other words, within said ranges of duration and angle of torpedo deviations the quadrant 16 oscillates in opposite directions within the space free intermediate the abutments 13 without engaging them in view of the dimensioning of the space intermediate the opposite abutments 13 and angular extent of quadrant 16. Then the torpedo oscillates around and finally reaches a path having the predetermined direction and passing through the point where the torpedo has started its course.

However, should the extent or duration of any deviation during such oscillation exceed given values, the parts 3, 32, 31, 40, 22, 28, 25, 19, 18, 14, 16 actuating the quadrant 16 and stopping it in front of either of abutments 13 are again operative, and the described operation again occurs to restore the torpedo on its original course. Such operation occurs whenever the angle or duration of deviations or both exceed given ranges.

It is known that torpedoes at the beginning of their course are subject to a large listing due to causes independent from the rudder actions, the amount of such listing being related with the torpedo speed and occurring always clockwise. Due to such listing action, during the changes in direction produced by rudder action, such rudder does not longer develop its full action, but only such action as depending upon the vertical component of its action under such conditions while the horizontal or depth rudder becomes operative on the steering action on account of the vertical component its action takes in listing conditions; on the other hand as usually at the beginning of its course torpedoes have their depth rudder locked in a stationary position against operation, said vertical component of the depth rudder action is always operative in the same direction. On the rudder 53 operating to steer the torpedo right hand the action of the depth rudder is antagonistic to that of said rudder 53 and the path has a larger radius while during a left hand steer action the actions of depth rudder and directional rudder add to each other and said path has a shorter radius.

The course governor of this invention includes a provision hereinafter described which is intended to account for the above stated action, in view of the fact that both in high speed launchings and in angled ones (that is when the torpedo is launched in a direction making a selected angle with respect to the final line of path therefor) the torpedo deviations from the line on which it is launched occur particularly at the beginning of the torpedo travel.

Such a provision is illustrated in Figure 5 which is a diagrammatary fragmentary view showing a portion of the device of Figure 4.

The crank pin 3 (Figure 5) in this construction is not longer located on the radius around axis 1 which is at right angles with respect to axis of distributor 32, and on the contrary it is located on a radius which makes an angle with first radius above referred to; further the crank pin 3 and the distributor 32 are coupled by means of bars 34, 36 fulcrumed on pivot 35 which is mounted on an arm 33 free to oscillate on a pivot pin 50; said pivot 50 is carried by a head 47 loose angularly and fast longitudinally on a screw 37 which may be adjusted longitudinally by screwing or unscrewing it into or from a stationary support 48 having a screw-threaded bore.

Thus, when the torpedo is steered and crank pin 3 is moved angularly in the direction of arrow $x$ say through 90°, the stroke of distributor slide 32 is equal to $x'$ whilst such a stroke is equal to $y'$ in respect of deviations through the same angle in the direction of arrow $y$; the ratio between said strokes has the same value in respect of deviations through smaller angles.

Consequently the strokes of piston 31 in the opposite directions are held in the same ratio and the same remark applies to strokes of roller 28 with respect to axis of disks 27; therefore different numbers of revolutions and different strokes of finger 23 are obtained which impart different durations to periods of time along which the quadrant 16 holds the rudder steered under a certain angle on a side and on the opposite one.

More particularly if the arrangement is such as to cause the rudder 53 to be held at an angle along a longer time when torpedo is steered right hand and along a shorter time when torpedo is steered left hand, said times being in a ratio corresponding with the ratio existing between areas actually confined between the predetermined path for the torpedo and the curve line it actually follows in respective cases, the torpedo is automatically restored in both cases on its original line of launching or, generally speaking, on a predetermined line.

Means may be provided for adjusting crank pin 3 angularly with respect to axis 1 and said means may comprise a cylindrical support 85 carrying said crank pin 3 and adjustable in a seat of ring 63 and having set means as a screw 86 to lock it in desired position.

Crank pin 3 may also be adjustable radially in said support 85 say by it being mounted in a radial slot 87 of said support 85 with means, as screw means, for locking it in desired position along said slot.

The present invention has been described by way of example in connection with an embodiment thereof in a torpedo, but of course, it may be embodied, with obvious modifications, to dirigible crafts of any kind, as aircrafts, ships and self-propelling vehicles generally.

What I claim as my invention and desire to secure as United States Letters Patent is:

1. A course governor for dirigible craft comprising a rudder, means for steering said rudder, a gyroscopic director controlling said rudder steering means, correcting means acting on said rudder steering means, a rotary member driven in a constant speed rotation, a member actuating said correcting means and arranged to traverse along a diameter of said rotary member in drive-receiving engagement therewith, and means operated by said gyroscopic director to shift said actuating member along its traverse path through a space from the rotary axis of said rotary member proportional with the deviation of said gyroscopic director due to a deviation of said craft from a predetermined path therefor and with duration of said deviation.

2. A course governor for dirigible craft comprising a rudder, means for steering said rudder, a gyroscopic director controlling said rudder steering means, correcting means acting on said rudder steering means, a constant speed motor, a disk driven by said constant speed motor, a roller actuating said correcting means and arranged to traverse along a diameter of said disk in drive-receiving engagement therewith, and means operated by said gyroscopic director to shift said roller along its traverse path through a space from the rotary axis of said disk proportional with the deviation of said gyroscopic director due to a deviation of said craft from a predetermined path therefor and with duration of said deviation.

3. A course governor for dirigible craft comprising a rudder, means for steering said rudder, a gyroscopic director controlling said rudder steering means, correcting means acting on said rudder steering means, control means actuated by said gyroscopic director and operating said correcting means, said control means including a control member operative on said correcting means, a rotary member driven in a constant speed rotation, a member arranged to traverse along a diameter of said rotary member in drive-receiving engagement therewith, means coupling said control member with said traversing member for its actuation thereby, and means operated by said gyroscopic director to shift said traversing member along its traverse path through a space from the rotary axis of said rotary member proportional with the deviation of said gyroscopic director due to a deviation of said craft from a predetermined path therefor.

4. A course governor for dirigible craft comprising a rudder, means for steering said rudder, a gyroscopic director controlling said rudder steering means, correcting means acting on said rudder steering means, control means actuated by said gyroscopic director and operating said correcting means, said control means including a control member operative on said correcting means, a rotary member driven in a constant speed rotation, a member arranged to traverse along a diameter of said rotary member in drive-receiving engagement therewith, means coupling said control member with said traversing member for its actuation thereby said coupling means including a part on said member and a part actuated by said traversing member, and cooperating means on said two parts engaging them directly with each other in respect of movements of said traversing member in the region of its position in register with the axis of said rotary member and releasing them from each other in respect of movements of said traversing member beyond said region, and means operated by said gyroscopic director to shift said traversing member along its traverse path through a space from the rotary axis of said rotary member proportional with the deviation of said gyroscopic director due to a deviation of said craft from a predetermined path therefor.

5. A course governor for dirigible craft comprising a rudder, means for steering said rudder, a gyroscopic director controlling said rudder steering means, correcting means acting on said rudder steering means, control means actuated by said gyroscopic director and operating said correcting means, said control means including a control member operative on said correcting means, a rotary member driven in a constant speed rotation, a member arranged to traverse along a diameter of said rotary member in drive-receiving engagement therewith, means coupling said control member with said traversing member for its actuation thereby said coupling means including a rocking member operative on said correcting means and having an engaging seat intermediate two release portions and a finger actuated by said traversing member said finger engaging said seat for oscillating said rocking member and being loosely movable along said release portions of the same and means operated by said gyroscopic director to shift said traversing member along its traverse path through a space from the rotary axis of said rotary member proportional with the deviation of said gyroscopic director due to a deviation of said craft from a predetermined path therefor.

6. A course governor for dirigible craft comprising a rudder, means for steering said rudder, a gyroscopic director controlling said rudder steering means, correcting means acting on said rudder steering means and including a removable stop cooperating with said rudder steering means to lock said steering means and rudder at an angle with respect to the straight way position of said rudder, control means actuated by said gyroscopic director and operating said correcting means, said control means including a control member operative on said correcting means, a rotary member driven in a constant speed rotation, a member arranged to traverse along a diameter of said rotary member in drive-receiving engagement therewith, means coupling said control member with said traversing member for its actuation thereby said coupling means including a part on said member and a part actuated by said traversing member, and cooperating means on said two parts engaging them directly with each other in respect of movements of said traversing member in the region of its position in register with the axis of said rotary member and releasing them from each other in respect of movements of said traversing member beyond said region, and means operated by said gyroscopic director to shift said traversing member along its traverse path through a space from the rotary axis of said rotary member proportional with the deviation of said gyroscopic director due to a deviation of said craft from a predetermined path therefor.

7. A course governor for dirigible craft comprising a rudder, means for steering said rudder, a gyroscopic director controlling said rudder steering means, correcting means acting on said rudder steering means and including a removable stop cooperating with said rudder steering means to lock said steering means and rudder at an angle on either side with respect to the straight way position of said rudder, control means actuated by said gyroscopic director and operating said correcting means, said control means including a control member operative on said correcting means, a rotary member driven in a constant speed rotation, a member arranged to traverse along a diameter of said rotary member in drive-receiving engagement therewith, means coupling said control member with said traversing member for its actuation thereby said coupling means including a part on said member and a part actuated by said traversing member, and cooperating means on said two parts engaging them directly with each other in respect of movements of said traversing member in the region of its position in register with the axis of said rotary member and releasing them from each other in respect of movements of said traversing member beyond said region, and means operated by said gyroscopic director to shift said traversing member along its traverse path through a space from the rotary axis of said rotary member proportional with the deviation of said gyroscopic director due to a deviation of said craft from a predetermined path therefor.

8. A course governor for dirigible craft comprising a rudder, means for steering said rudder, a gyroscopic director controlling said rudder steering means, correcting means including an oscillatable stop quadrant and means on said rudder steering means for engagement with said oscillatable stop quadrant when it is moved off from an intermediate inoperative position, control means actuated by said gyroscopic director and operating said quadrant, said control means including a control member operative on said correcting means, a rotary member driven in a constant speed rotation, a member arranged to traverse along a diameter of said rotary member in drive-receiving engagement therewith, means coupling said control member with said traversing member for its actuation thereby said coupling means including a part on said member and a part actuated by said traversing member, cooperating means on said two parts engaging them directly with each other in respect of movements of said traversing member in the region of its position in register with the axis of said rotary member and releasing them from each other in respect of movements of said traversing member beyond said region, and means operated by said gyroscopic director to shift said traversing member along its traverse path through a space from the rotary axis of said rotary member proportional with the deviation of said gyroscopic director due to a deviation of said craft from a predetermined path therefor.

9. A course governor for dirigible craft comprising a rudder, means for steering said rudder, a gyroscopic director controlling said rudder steering means, correcting means including an oscillatable stop quadrant, a fork shaped member in said rudder steering means embracing said quadrant and means on the ends of said fork for engagement with said quadrant, control means actuated by said gyroscopic director and operating said quadrant, said control means including a control member operative on said correcting means, a rotary member driven in a constant speed rotation, a member arranged to traverse along a diameter of said rotary member in drive-receiving engagement therewith, means coupling said control member with said traversing member for its actuation thereby said coupling means including a part on said member and a part actuated by said traversing member, cooperating means on said two parts engaging them directly with each other in respect of movements of said traversing member in the region of its position in register with the axis of said rotary member and releasing them from each other in respect of movements of said traversing member beyond said region, and means operated by said gyroscopic director to shift said traversing member along its traverse path through a space from the rotary axis of said rotary member proportional with the deviation of said gyroscopic director due to a deviation of said craft from a predetermined path therefor.

10. A course governor for dirigible craft comprising a rudder, means for steering said rudder, a gyroscopic director controlling said rudder steering means, correcting means including an oscillatable stop quadrant, a fork shaped member in said rudder steering means embracing said quadrant and independently adjustable means on the ends of said fork for engagement with said quadrant, control means actuated by said gyroscopic director and operating said quadrant, said control means including a control member operative on said correcting means, a rotary member driven in a constant speed rotation, a member arranged to traverse along a diameter of said rotary member in drive-receiving engagement therewith, means coupling said control member with said traversing member for its actuation thereby said coupling means including a part on said member and a part actuated by said traversing member, cooperating means on said two parts engaging them directly with each other in respect of movements of said traversing member in the region of its position in register with the axis of said rotary member and releasing them from each other in respect of movements of said traversing member beyond said region, and means operated by said gyroscopic director to shift said traversing member along its traverse path through a space from the rotary axis of said rotary member proportional with the deviation of said gyroscopic director due to a deviation of said craft from a predetermined path therefor.

11. A course governor for dirigible craft comprising a rudder, servomotor means for steering said rudder, a gyroscopic director controlling said rudder steering means, correcting means acting on said rudder steering means, control means actuated by said gyroscopic director and operating said correcting means, said control means including a control member operative on said correcting means, a rotary member driven in a constant speed rotation, a member arranged to traverse along a diameter of said rotary member in drive-receiving engagement therewith, means coupling said control member with said traversing member for its actuation thereby, and means operated by said gyroscopic director to shift said traversing member along its traverse path through a space from the rotary axis of said rotary member proportional with the deviation of said gyroscopic director due to a deviation of said craft from a predetermined path therefor.

12. A course governor for dirigible craft comprising a rudder, means for steering said rudder, a gyroscopic director controlling said rudder steering means, correcting means acting on said rudder steering means, servomotor control means actuated by said gyroscopic director and operating said correcting means, said control means including a control member operative on said correcting means, a rotary member driven in a constant speed rotation, a member arranged to traverse along a diameter of said rotary member in drive-receiving engagement therewith, means coupling said control member with said traversing member for its actuation thereby, and means operated by said gyroscopic director to shift said traversing member along its traverse path through a space from the rotary axis of said rotary member proportional with the deviation of said gyroscopic director due to a deviation of said craft from a predetermined path therefor.

13. A course governor for dirigible craft comprising a rudder, means for steering said rudder, a gyroscopic director controlling said rudder steering means, correcting means acting on said rudder steering means, control means operating said correcting means, a transmission gear intermediate said gyroscopic director and said control means, said transmission gear making the amount of actuation of said control means upon said craft deviating on one side different with respect of the amount of similar actuation upon said craft deviating on the other side, said control means including a control member operative on said correcting means, a rotary member driven in a constant speed rotation, a member arranged to traverse along a diameter of said rotary member in drive-receiving engagement therewith, means coupling said control member with said traversing member for its actuation thereby, and means operated by said gyroscopic director to shift said traversing member along its traverse path through a space from the rotary axis of said rotary member proportional with the deviation of said gyroscopic director due to a deviation of said craft from a predetermined path therefor.

14. A course governor for dirigible craft comprising a rudder, means for steering said rudder, a gyroscopic director controlling said rudder steering means, correcting means acting on said rudder steering means, control means operating said correcting means, a linkage connected with said control means, a crank pin on said gyroscopic director operating said linkage and eccentric with respect to the vertical axis of deviation of said gyroscopic director, said crank pin being angularly offset with respect to radius from said axis which is perpendicular to the fore-and-aft axis of said craft, said control means including a control member operative on said correcting means, a rotary member driven in a constant speed rotation, a member arranged to traverse along a diameter of said rotary member in drive-receiving engagement therewith, means coupling said control member with said traversing member for its actuation thereby, and means operated by said gyroscopic director to shift said traversing member along its traverse path through a space from the rotary axis of said rotary member proportional with the deviation of said gyroscopic director due to a deviation of said craft from a predetermined path therefor.

15. A course governor for dirigible craft comprising a rudder, means for steering said rudder, a gyroscopic director controlling said rudder steering means, correcting means acting on said rudder steering means, control means operating said correcting means, a linkage connected with said control means, a crank pin on said gyroscopic director operating said linkage and eccentric with respect to the vertical axis of deviation of said gyroscopic director, said crank pin being radially adjustable and angularly offset with respect to radius from said axis which is perpendicular to the fore-and-aft axis of said craft, said control means including a control member operative on said correcting means, a rotary member driven in a constant speed rotation, a member arranged to traverse along a diameter of said rotary member in drive-receiving engagement therewith, means coupling said control member with said traversing member for its actuation thereby, and means operated by said gyroscopic director to shift said traversing member along its traverse path through a space from the rotary axis of said rotary member proportional with the deviation of said gyroscopic director due to a deviation of said craft from a predetermined path therefor.

16. A course governor for dirigible craft comprising a rudder, means for steering said rudder, a gyroscopic director controlling said rudder steering means, correcting means acting on said rudder steering means, control means operating said correcting means, a linkage connected with said control means, a crank pin on said gyroscopic director operating said linkage and eccentric with respect to the vertical axis of deviation of said gyroscopic director, said crank pin being angularly offset with respect to radius from said axis which is perpendicular to the fore-and-aft axis of said craft, said linkage comprising a pivot pin interconnecting two subsequent parts thereof and means for adjusting the position of said pivot pin, said control means including a control member operative on said correcting means, a rotary member driven in a constant speed rotation, a member arranged to traverse along a diameter of said rotary member in drive-receiving engagement therewith, means coupling said control member with said traversing member for its actuation thereby, and means operated by said gyroscopic director to shift said traversing member along its traverse path through a space from the rotary axis of said rotary member proportional with the deviation of said gyroscopic director due to a deviation of said craft from a predetermined path therefor.

17. A course governor for dirigible craft comprising a rudder, means for steering said rudder, a gyroscopic director controlling said rudder steering means, means for locking said rudder steering means and rudder at an angle on either side from the straight way position of said rudder, control means for carrying said locking means in and out of locking position, a part mounted to move on both sides from an intermediate position, means for moving said part with respect to its intermediate position to an extent proportional with the deviation of said gyroscopic director due to a deviation of said craft from a predetermined path and with the time said deviation is operative, a member operating said control means and means operatively engaging said member and part in the region of the motion of said part adjacent to said intermediate position thereof and leaving said member unaffected by the movement of said part beyond said region.

18. A course governor for dirigible craft comprising a rudder, means for steering said rudder, a gyroscopic director controlling said rudder steering means, means for locking said rudder steering means and rudder at an angle on either side from the straight way position of said rudder, control means for carrying said locking means in and out locking position, a part mounted to move on both sides from an intermediate position, a rotary member, means for driving said rotary member with constant speed, a roller mounted to traverse along a diameter of said rotary member in drive-receiving engagement therewith, a gear operated by said roller and moving said part, means operated by said gyroscopic director to traverse said roller on said rotary member from the rotary axis of said rotary member through an extent proportional with the deviation of said gyroscopic director with respect to the fore-and-aft axis of said craft, a member operating said control means and means operatively engaging said member and part in the region of the motion of said part adjacent to said intermediate position thereof and leaving said member unaffected by the movement of said part beyond said region.

19. A course governor for dirigible craft comprising a rudder, means for steering said rudder, a gyroscopic director controlling said rudder steering means, an oscillatable quadrant, parts on said rudder steering means for engagement by said quadrant on it being shifted on either side from an intermediate position, control means for moving said quadrant from its intermediate inoperative position, a part mounted to move on both sides from an intermediate position, means for moving said part with respect to its intermediate position to an extent proportional with the deviation of said gyroscopic director due to a deviation of said craft from a predetermined path and with the time said deviation is operative, a member operating said control means and means operatively engaging said member and part in the region of the motion of said part adjacent to said intermediate position thereof and leaving said member unaffected by the movement of said part beyond said region.

20. A course governor for dirigible craft comprising a rudder, means for steering said rudder, a gyroscopic director controlling said rudder steering means, means for locking said rudder steering means and rudder at an angle on either side from the straight way position of said rudder, control means for carrying said locking means in and out of locking position, a part mounted to move on both sides from an intermediate position, means for moving said part with respect to its intermediate position to an extent proportional with the deviation of said gyroscopic director due to a deviation of said craft from a predetermined path and with the time said deviation is operative, a rocking member operating said control means said rocking member having an intermediate portion operative for engagement by said part and a portion at each side of said engaging portion which is inoperative for engagement by said part.

21. A course governor for dirigible craft comprising a rudder, means for steering said rudder, a gyroscopic director controlling said rudder steering means, means for locking said rudder steering means and rudder at an angle on either side from the straight way position of said rudder, control means for carrying said locking means in and out of locking position, a part mounted to move on both sides from an intermediate position, means for moving said part with respect to its intermediate position through extents proportional with the deviation of said gyroscopic director with respect to the fore-and-aft axis of said craft and different according to the side on which said deviation occurs, a member operating said control means, and means operatively engaging said member and part in the region of the motion of said part adjacent to said intermediate position thereof and leaving said member unaffected by the movement of said part beyond said region.

22. A course governor for dirigible craft comprising a rudder, means for steering said rudder, a gyroscopic director controlling said rudder steering means, correcting means acting on said rudder steering means for temporarily restricting the return of said rudder, and means dependent upon the extent and duration of the response of said gyroscopic director for controlling said return restricting means, said control means leaving said correcting means inoperative in response to deviations of said craft from its course having an extent or a duration less than a predetermined value.

23. A course governor for dirigible craft comprising a rudder, means for steering said rudder, a gyroscopic director controlling said rudder steering means, stop means adapted to cooperate with said rudder steering means during their return, and means actuated by said gyroscopic director and dependent upon the extent and duration of the response of said gyroscopic director for bringing said stop means into operative position to restrict the return of said rudder and delay the reversal of rudder steering until said craft has reached its previous course.

24. A course governor for dirigible craft comprising a rudder, means for steering said rudder, a gyroscopic director controlling said rudder steering means, stop means adapted to cooperate with said rudder steering means after a portion of their return stroke, and means actuated by said gyroscopic director and dependent upon the extent and duration of the response of said gyroscopic director for bringing said stop means into operative position to maintain said rudder shifted through a steer angle less than the preceding steer angle until said craft has reached its previous course.

25. A course governor for dirigible craft, comprising a rudder, means for steering said rudder, a gyroscopic director controlling said rudder-steering means, and correcting means acting on said rudder-steering means for restricting the return of the rudder from the deviated position in which it has been carried by said rudder-steering means until said craft reaches the line of its previous course.

26. A course governor for dirigible craft, comprising a rudder, means for steering said rudder, a gyroscopic director contolling said rudder-steering means, and correcting means acting on said rudder-steering means for restricting the return of the rudder from the deviated position in which it has been carried by said rudder-steering means until after said craft has reached a direction parallel to its previous course and until said craft reaches the line of its previous course.

27. A course governor for dirigible craft, comprising a rudder, means for steering said rudder, a gyroscopic director controlling said rudder-steering means, and correcting means acting on said rudder-steering means for restricting the return of the rudder from the deviated position in which it has been carried by said rudder-steering means until said craft reaches the line of its previous course, said correcting means being inoperative in response to deviations of said craft from its course having an extent or a duration less than a predetermined value.

28. A course governor for dirigible craft, comprising a rudder, means for steering said rudder, a gyroscopic director controlling said rudder-steering means, and correcting means acting on said rudder-steering means and dependent upon the extent and duration of the response of said gyroscopic director for restricting the return of the rudder until after said craft has reached a direction parallel to the previous course and until said craft reaches the line of said course.

PAOLO ORLANDO.